United States Patent
Cheng

(10) Patent No.: US 10,347,213 B2
(45) Date of Patent: Jul. 9, 2019

(54) METHODS FOR ADJUSTING PANEL BRIGHTNESS AND BRIGHTNESS ADJUSTMENT SYSTEM

(71) Applicant: MEDIATEK INC., Hsin-Chu (TW)

(72) Inventor: Fan-Chieh Cheng, Keelung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/663,969

(22) Filed: Jul. 31, 2017

(65) Prior Publication Data

US 2018/0053487 A1 Feb. 22, 2018

Related U.S. Application Data

(60) Provisional application No. 62/376,469, filed on Aug. 18, 2016.

(51) Int. Cl.
| G09G 5/10 | (2006.01) |
| G06F 3/048 | (2013.01) |
| H04N 9/64 | (2006.01) |
| H04N 9/73 | (2006.01) |
| G06F 3/0484 | (2013.01) |
| G09G 3/3275 | (2016.01) |

(52) U.S. Cl.
CPC ........... *G09G 5/10* (2013.01); *G06F 3/04847* (2013.01); *G09G 3/3275* (2013.01); *G09G 2320/0626* (2013.01); *G09G 2320/0673* (2013.01); *G09G 2320/08* (2013.01); *G09G 2354/00* (2013.01); *G09G 2360/144* (2013.01)

(58) Field of Classification Search
CPC combination set(s) only.
See application file for complete search history.

(56) References Cited

U.S. PATENT DOCUMENTS

| 6,683,585 | B1 * | 1/2004 | Nakano | G06F 3/04897 345/10 |
| 8,358,264 | B2 | 1/2013 | Nose et al. | |
| 2002/0141005 | A1 * | 10/2002 | Okisu | G06T 3/4053 358/540 |
| 2009/0224678 | A1 * | 9/2009 | Wang | G09G 3/3426 315/158 |
| 2009/0278790 | A1 * | 11/2009 | Choi | G09G 3/3406 345/102 |
| 2013/0069998 | A1 * | 3/2013 | Fergason | G09G 3/3406 345/690 |
| 2015/0116389 | A1 | 4/2015 | Watanabe | |
| 2016/0035285 | A1 | 2/2016 | Jung | |
| 2016/0365036 | A1 * | 12/2016 | Xu | G09G 3/3275 |
| 2018/0090101 | A1 * | 3/2018 | Offredi | G09G 3/2029 |

FOREIGN PATENT DOCUMENTS

| TW | 201248604 A | 12/2012 |
| TW | 201612878 A | 4/2016 |

* cited by examiner

*Primary Examiner* — Wesner Sajous
(74) *Attorney, Agent, or Firm* — McClure, Qualey & Rodack, LLP

(57) ABSTRACT

A method for adjusting brightness of a display panel and a brightness adjustment system are provided. The brightness adjustment system includes a display panel and a first controller. According to the provided method, the first controller receives first brightness control data and receives first image data to be displayed on the display panel. The first controller further converts the first image data into second image data according to the first brightness control data for adjusting the brightness of the display panel.

16 Claims, 8 Drawing Sheets

METHODS FOR ADJUSTING PANEL BRIGHTNESS AND BRIGHTNESS ADJUSTMENT SYSTEM

CROSS REFERENCE TO RELATED APPLICATIONS

This application claims the benefit of U.S. Provisional Application No. 62/376,469, filed on Aug. 18, 2016, the contents of which are incorporated herein by reference.

BACKGROUND OF THE INVENTION

Field of the Invention

The invention relates to a method for adjusting brightness of a display panel, and more particularly, to a brightness adjustment system.

Description of the Related Art

In general, an electronic apparatus with a display panel provides a function for adjusting the brightness of the display panel. In some cases, a control signal for adjusting the brightness of the display panel is a 10-bit signal, while the display panel provides only 8-bit levels (that is, 256 levels (0~255)) for the brightness. Thus, a brightness controller is provided to convert the 10-bit control signal to an 8-bit signal through linear mapping for the display panel to control the brightness. However, the linear mapping may induce flicker phenomenon during the brightness adjustment. Specifically, when the brightness adjustment is performed for low brightness levels, the flicker becomes more serious.

BRIEF SUMMARY OF THE INVENTION

An exemplary embodiment of a method for adjusting brightness of a display panel is provided. The method comprises steps of receiving first brightness control data; receiving first image data to be displayed on the display panel; and converting the first image data into second image data according to the first brightness control data for adjusting the brightness of the display panel.

An exemplary embodiment of a brightness adjustment system is provided. The brightness adjustment system comprises a display panel and a first controller. The first controller receives first brightness control data and receives first image data to be displayed on the display panel. The first controller converts the first image data into second image data according to the first brightness control data for adjusting the brightness of the display panel.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
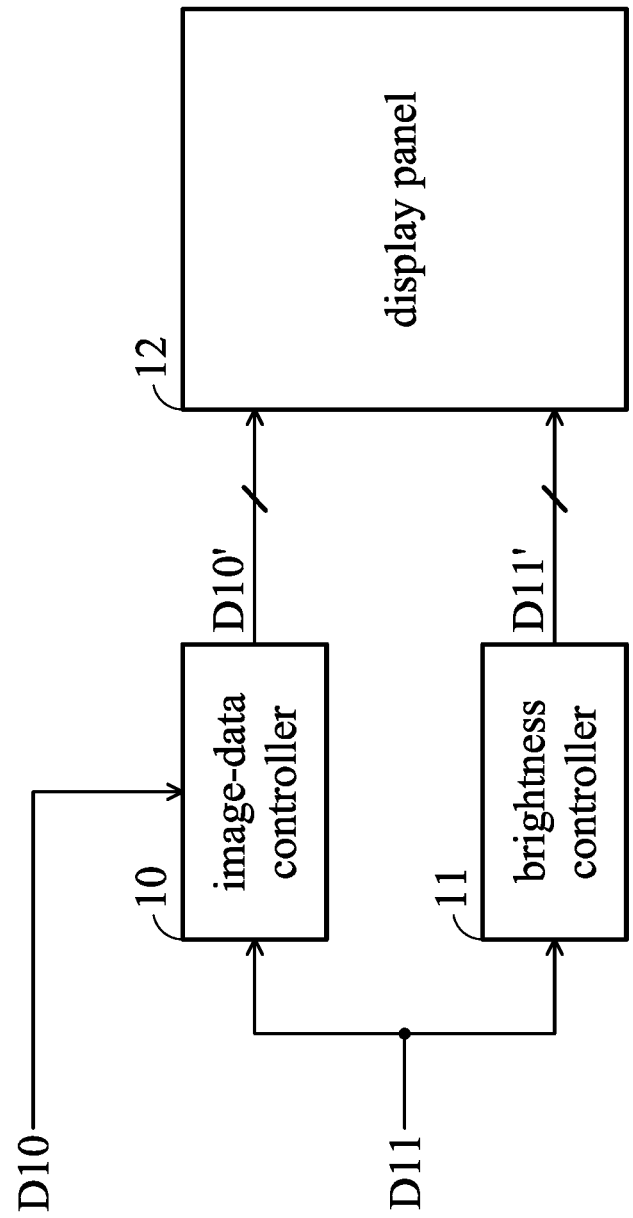
FIG. 1 shows one exemplary embodiment of a brightness adjustment system.

FIG. 1 shows an exemplary embodiment of a brightness adjustment system. Referring to FIG. 1, a brightness adjustment system 1 comprises an image-data controller 10, a brightness controller 11, and display panel 12. The brightness adjustment system 1 is implemented for an electronic device, such as a smart phone, a camera, a laptop, or any apparatus with a display panel. The display panel 12 may be an organic light-emitting diode (OLED) display panel or a liquid-crystal display (LCD) panel.

Figure 2:
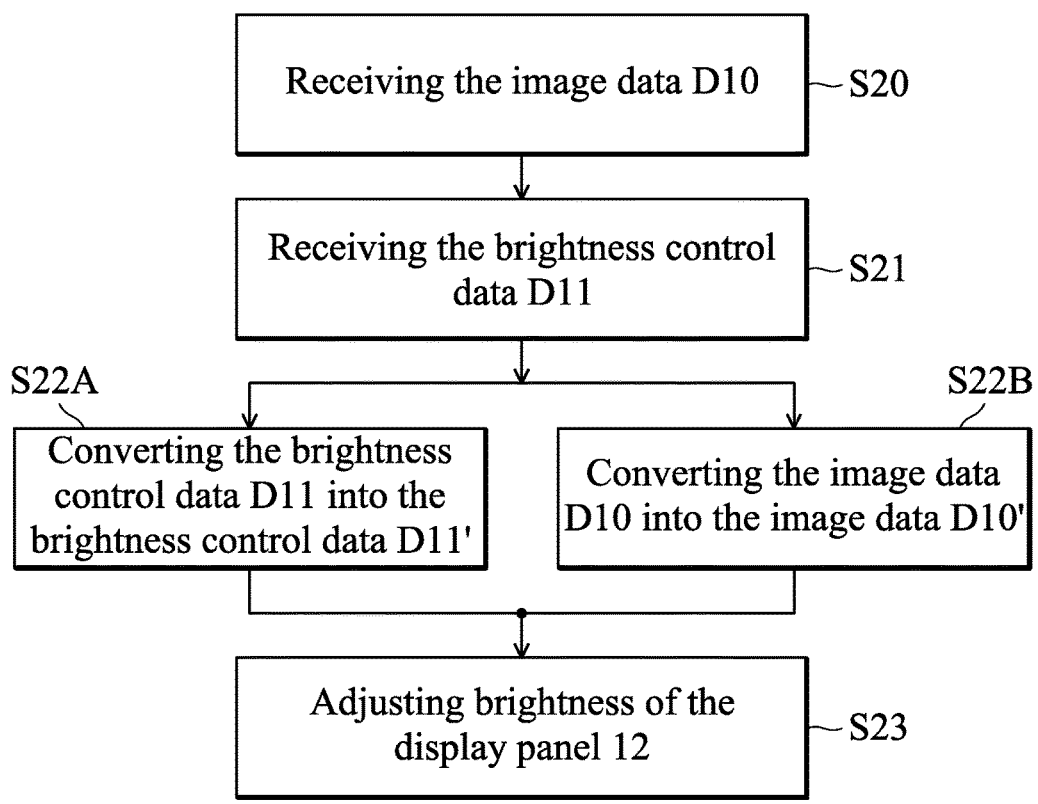
FIG. 2 show an exemplary embodiment of a of a method of adjusting brightness of a display panel.

FIG. 2 shows an exemplary embodiment of a method of adjusting brightness of a display panel. The method for adjusting the brightness of the display panel will described by referring to FIGS. 1 and 2. At the step S20, the image-data controller 10 receives image data D10 which may be generated by or transmitted from an image capturing device (such as a camera or a scanner) or an image signal processor (ISP). The image data D10 indicates image information of at least one pixel (such as the gray level), and the content of the image data D10 will be displayed on the display panel 12. Both of the image-data controller 10 and the brightness controller 11 receive brightness control data D11 at the step S21. The brightness control data D11 is used to control the brightness of the display panel 12. The level or value of brightness control data D11 will affect the operations of the image-data controller 10 to change the intensity of the image data D10. In an embodiment, the brightness control data D11 is generated by a man-machine interface (MMI) in response to user behavior, such as a user interface (UI) object shown on the display panel 12.

Figure 3:
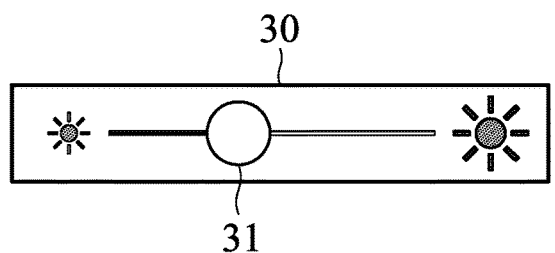
FIG. 3 shows an exemplary embodiment of a user interface (UI) object of a man-machine interface (MMI) applied for the brightness adjustment system of FIG. 1.

As shown in FIG. 3, an UI object is achieved by an adjustment bar 30 for the brightness of the display panel 12. When the user moves the virtual button 31 to the left, the brightness of the display panel 12 will become less. When the user moves the virtual button 31 to the right, the brightness of the display panel 12 will become greater. In another embodiment, the electronic system 1 comprises a sensor which is used to detect the intensity of the environment light of the electronic system 1 or the display panel 12 and generate the brightness control data D11.

Figure 4:
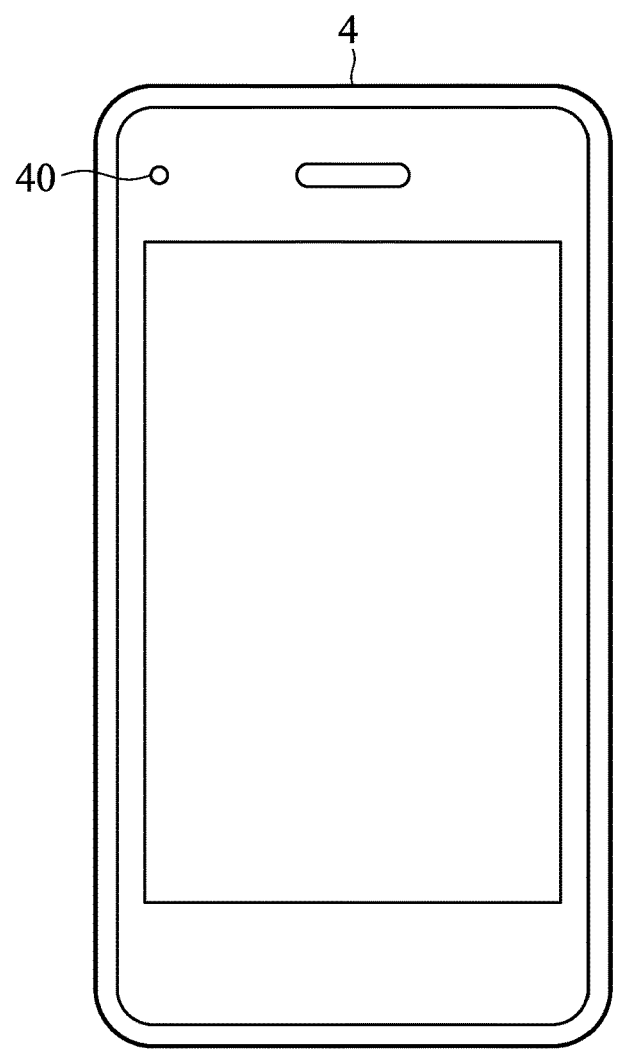
FIG. 4 shows an exemplary embodiment of a light sensor applied for the brightness adjustment system of FIG. 1.

As shown in FIG. 4, in the cases where the electronic device 1 is a smart phone 4, there is a sensor disposed on the front side of the smart phone 4. The sensor 40 detects the environment light of the smart phone 4 and generates the brightness control data D11 according to the detected intensity of the environment light. Thus, the brightness of the display panel 12 will vary in response to the variation of the intensity of the environment light. In the embodiment of FIG. 2, the step S21 is performed after the step S20. However, in other embodiments, the step S20 may be performed after the step S21, or the steps S20 and S21 may be performed simultaneously.

After the brightness controller 11 receives the brightness control data D11, the brightness controller 11 converts the brightness control data D11 into brightness control data D11' (step S22A). In the embodiment, the brightness control data D11 is 10-bit data which provides 10-bit perceived brightness for the display panel 12, and the brightness controller 11 converts the 10-bit brightness control data D11 into 8-bit brightness control data D11' through a specific algorithm. Moreover, after the image-data controller 10 receives the brightness control data D11, the image-data controller 10 converts the image data D10 into image data D10' through a specific algorithm (step S22B). In the embodiment, the image data D10 is 10-bit data, and the image-data controller 10 converts the 10-bit image data D10 into 8-bit image data D10'. In an embodiment, the steps S22A and S22B may be performed at different time. In another embodiment, the steps S22A and S22B may be performed simultaneously. Then, the display panel 12 receives the brightness control data D11' and the image data D10' and adjusts the brightness according to the brightness control data D11' and the image data D10' (step S23) when the display panel 1 shows images corresponding to the content of the image data D10.

According to the above embodiment, through the conversion operations of the image-data controller 10 and the brightness controller 11, the 10-bit brightness control data D11 whose value is one of 1024 values can be used to adjust the brightness of the display panel 12 to be one of 256 levels. Equation (1) shows a panel brightness model which represents the brightness of the display panel 12 by 1024 resolution:

$$P = P\max \times (C/C\max)^\gamma \times (B/B\max) \qquad \text{Equation (1)}$$

Wherein, P represents the level of the 10-bit perceived brightness of the display panel 12 and is in the range 0~1023. Pmax represents the maximum level of the 10-bit perceived brightness; that is 1023. C represents the intensity value of the 8-bit image data D10' (that is, the gray level of the 8-bit image data D10') and is in the range 0~255. Cmax represents the maximum intensity value for the 8-bit image data D10'; that is 255. B represents the value of the 8-bit brightness control data D11' and is in the range 0~255. Bmax represents the maximum value for the 8-bit brightness control data D11'; that is 255. Thus, the level of the 10-bit perceived brightness of the display panel 12 is determined according to the intensity value of the 8-bit image data D10' and the brightness value of the 8-bit brightness control data D11'. According to the above embodiment, the level of the 10-bit perceived brightness of the display panel 12 will be adjusted by performing the conversion operations on the image data D10 and the brightness control data D11 through specific algorithms. The specific algorithms for the conversion operation will be described in the following paragraphs.

Figure 5:
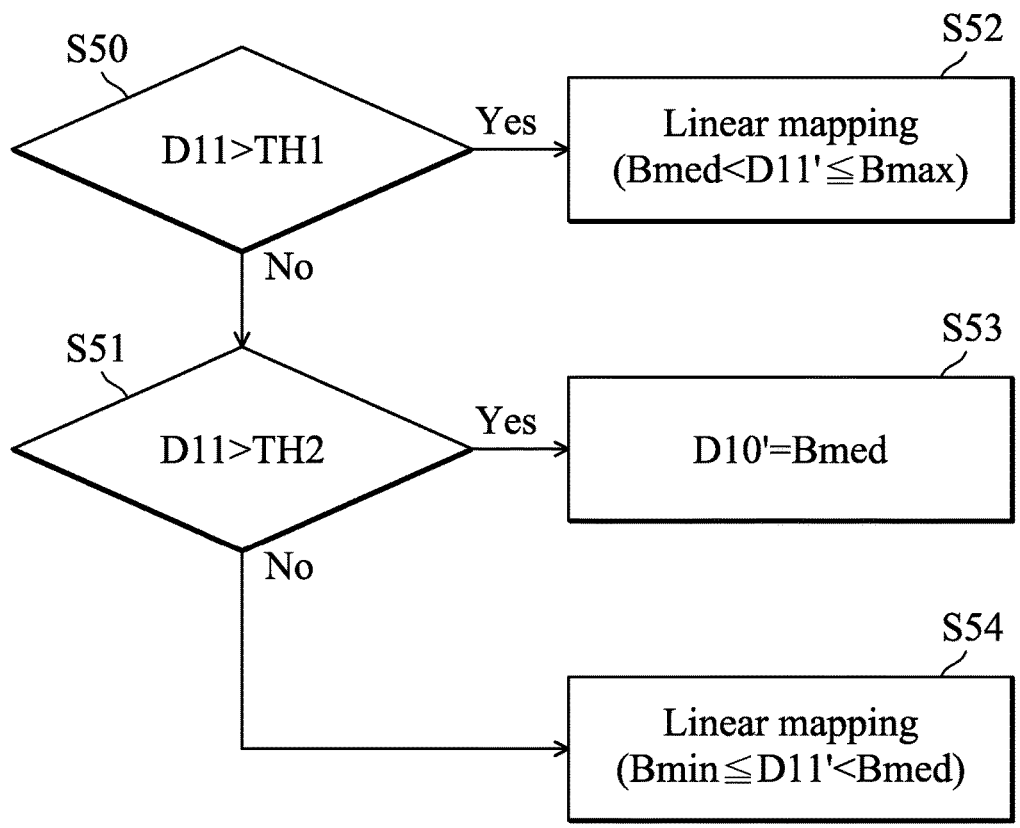
FIG. 5 shows an exemplary embodiment of a conversion operation for brightness control data.
Figure 7:
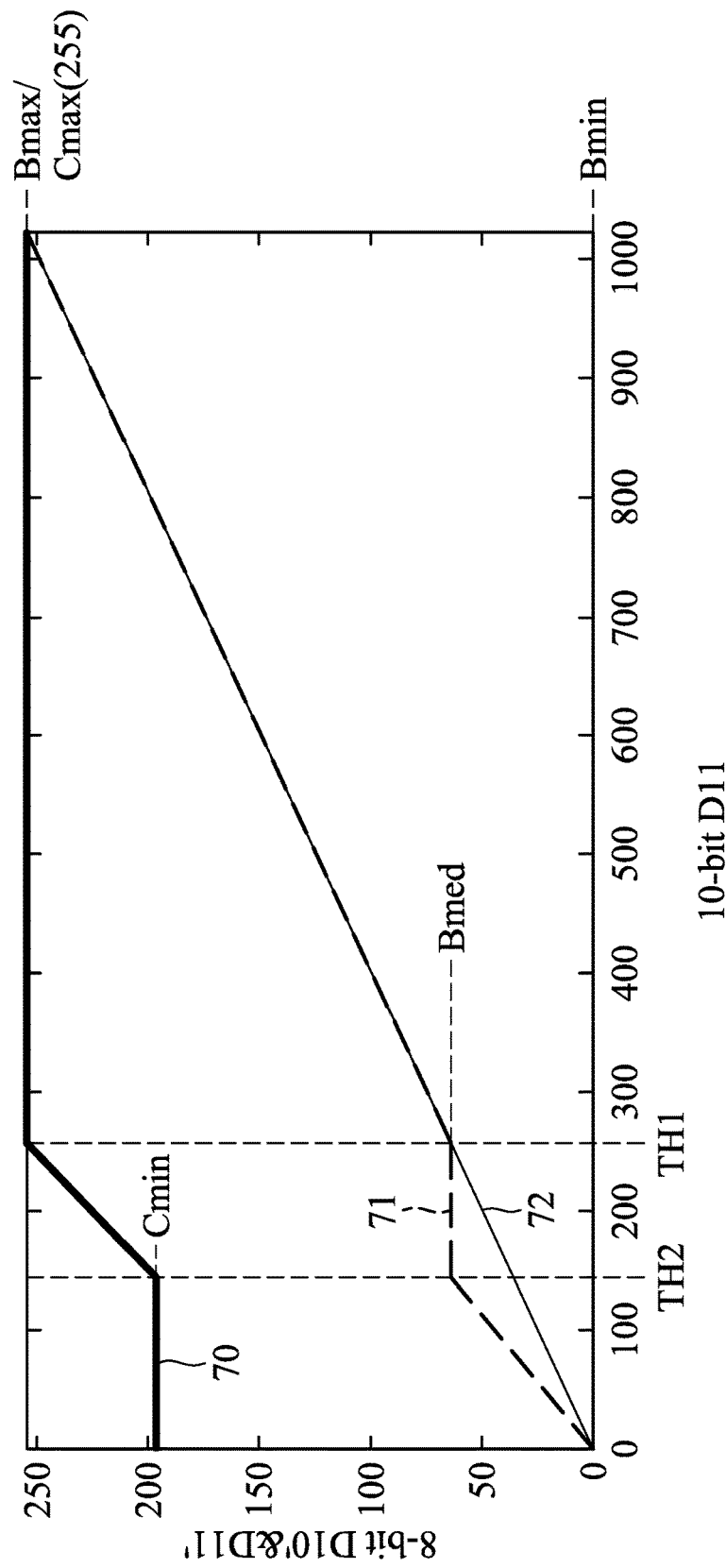
FIG. 7 shows an exemplary embodiment of conversion curves for image data and brightness control data.

FIG. 5 shows an exemplary embodiment of the operation of converting the brightness control data D11 into the brightness control data D11' at the step S22A. FIG. 7 shows the conversion curve 71 between the brightness control data D11 and the brightness control data D11'. In FIG. 7, a conventional conversion curve 72 for a brightness control data or signal is also shown. The conventional conversion curve 72 indicates a linear relationship for all 1024 values or levels of the brightness control data. Referring to FIGS. 5 and 7, when the brightness controller 11 receives the brightness control data D11, the brightness controller 11 determines whether the value of the brightness control data D11 is larger than a threshold TH1 (step S50, D11>TH1?). When the brightness controller 11 determines that the value of the brightness control data D11 is larger than the threshold TH1 (step S50—Yes), the brightness controller 11 converts the brightness control data D11 into the brightness control data D11' through linear mapping (step S52). In details, the brightness controller 11 converts the brightness control data D11 into the brightness control data D11' by one linear relationship, so that the value of the brightness control data D11' is set to be a value which is in the range larger than a middle value Bmed and less than the maximum value Bmax or equal to the maximum value Bmax (Bmed<D11'≤Bmax), wherein the middle value Bmed is smaller than the maximum value Bmax. When the brightness controller 11 determines that the value of the brightness control data D11 is not larger than the threshold TH1 (step S50-No), the brightness controller 11 determines whether the value of the brightness control data D11 is larger than another threshold TH2 (step S51, D11>TH2?).

When the brightness controller 11 determines that the value of the brightness control data D11 is larger than the threshold TH2 (step S51—Yes) (that is, TH2<D11<TH1), the brightness controller 11 sets the value of the brightness control data D11 to be the middle value Bmed (step S53, D10'=Bmed). When the brightness controller 11 determines that the value of the brightness control data D11 is not larger than the threshold TH2 (step S51-No), the brightness controller 11 converts the brightness control data D11 into the brightness control data D11' through linear mapping (S54). In details, the brightness controller 11 converts the brightness control data D11 into the brightness control data D11' by another linear relationship, so that the value of the brightness control data D11' is set to be a value which is equal to a minimum value Bmin or in the range larger than the minimum value Bmin and less than the middle value Bmed (Bmin≤D11'<Bmed), wherein the minimum value Bmin is smaller than the middle value Bmed. The linear relationship used in the step S52 is different from the linear relationship used in the step S54. Referring to FIG. 5, the slop between the middle value Bmed and the maximum value Bmax is different from the slop between the minimum value Bmin and the middle value Bmed. In the embodiment, the minimum value Bmin is set to 0. In other embodiment, the minimum value Bmin is set to 16.

Figure 6:
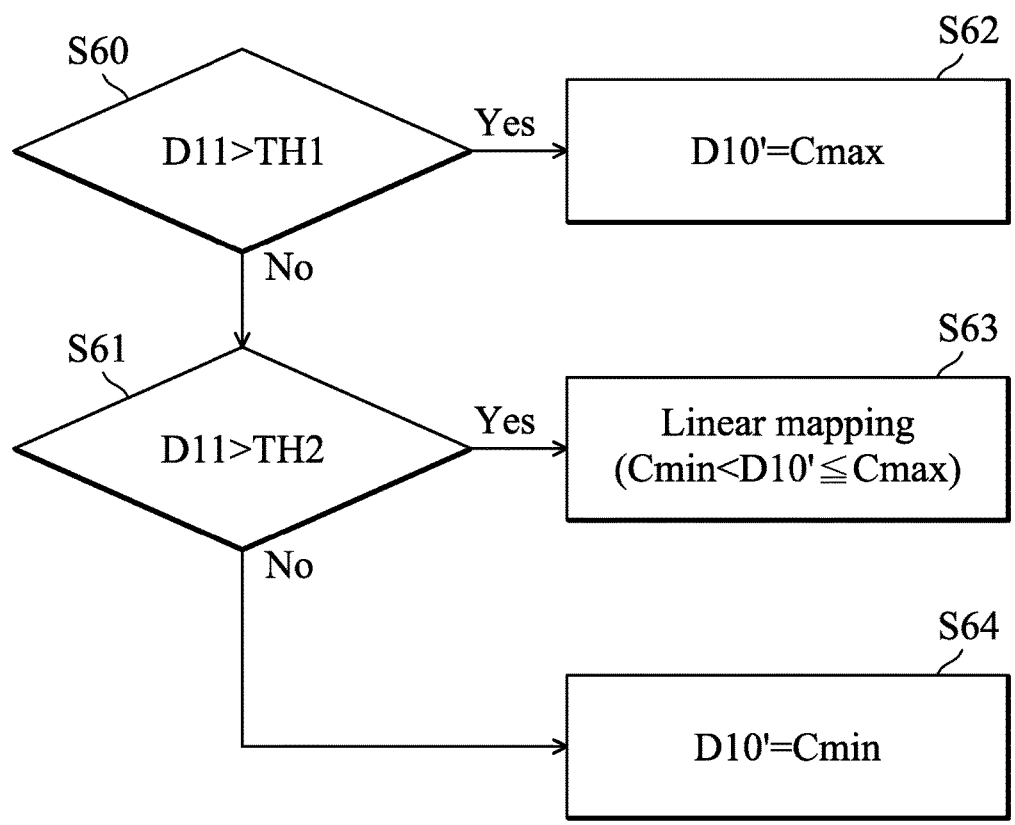
FIG. 6 shows an exemplary embodiment of a conversion operation for image data.

FIG. 6 shows an exemplary embodiment of the operation of converting the image data D10 into the image data D10' at the step S22B. FIG. 7 also shows the conversion curve 70 between the image data D10 and the image data D10'. Referring to FIGS. 6 and 7, when the image-data controller 10 receives the brightness control data D10, the image-data controller 10 determines whether the value of the brightness control data D11 is larger than the threshold TH1 (step S60, D11>TH1?). When the image-data controller 10 determines that the value of the brightness control data D11 is larger than the threshold TH1 (step S60—Yes), the image-data controller 10 sets the value of the image data D10 to be the maximum intensity Cmax (step S62, D10'=Cmax). When the image-data controller 10 determines that the value of the brightness control data D11 is not larger than the threshold TH1 (step S60-No), the image-data controller 10 determines whether the value of the brightness control data D11 is larger than the threshold TH2 (step S61, D11>TH2?). When the image-data controller 10 determines that the value of the brightness control data D11 is larger than the threshold TH2 (step S61—Yes) (that is, TH2<D11<TH1), the image-data controller 10 converts the image data D10 into the image data D10' through linear mapping (step S63). In details, the image-data controller 10 converts the image control data D10 into the image data D10' by one linear relationship, so that the value of the image data D10' is set to be an intensity value which is in the range larger than a minimum value Cmin and less than the maximum value Cmax or equal to the maximum value Cmax (Cmin<D10'≤Cmax), wherein the minimum value Cmin is smaller than the maximum value Cmax. When the image-data controller 10 determines that the value of the brightness control data D11 is not larger than the threshold TH2 (step S61-No), the image-data controller 10 sets the value of the image data D10 to be the minimum value Cmin (step S64m D10'=Dmin).

Figure 8:
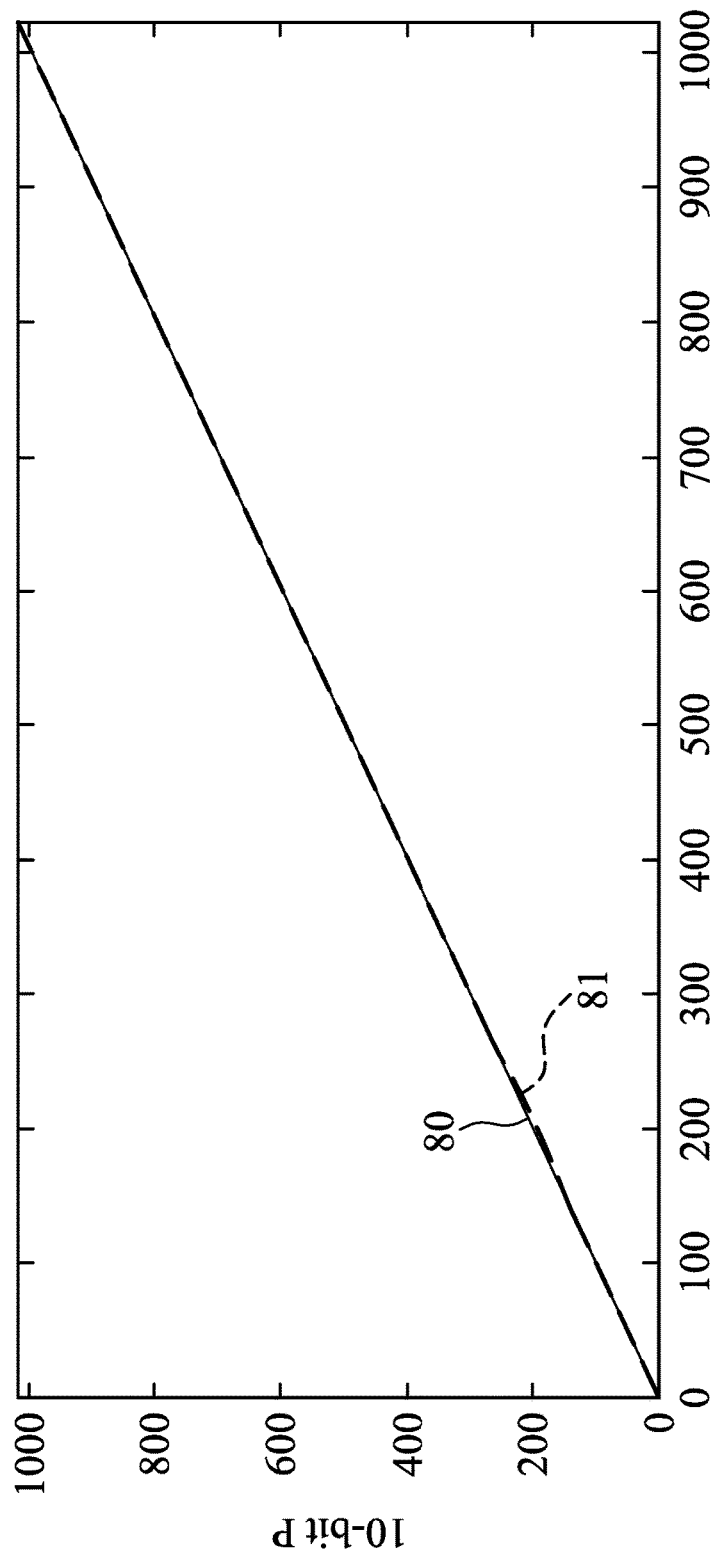
FIG. 8 shows an exemplary embodiment of a curve between brightness control data and brightness of a display panel.

FIG. 8 shows an exemplary embodiment of the curve 80 between the brightness control data D11 and the brightness of the display panel 12 (P). FIG. 8 also shows the curve 81 which is an ideal linear relationship between a 10-bit brightness control signal and 10-bit-level brightness of a display panel controlled by the brightness control signal. Referring to FIG. 8, the curve 80 is almost the same as the ideal linear curve 81. Thus, according to the brightness adjustment achieved through performing the conversion operations on both of the image data D10 and the brightness control data D11, the 10-bit brightness control data D11 can adjust the brightness of the display panel 12 in a range 0-1023 with reduced flicker.

In the embodiment of FIG. 1, the image-data controller 10 and the brightness controller 11 may be disposed in the host of the brightness adjustment system 1. For example, at least one of the image-data controller 10 and the brightness controller 11 is part of the central processing unit (CPU) of the host. Alternatively, at least one of the image-data controller 10 and the brightness controller 11 is a special purpose processor of the host. For example, the image-data controller is an image signal processor (ISP). In these cases, the image-data controller 10 and the brightness controller 11 respectively transmit the image data D10' and the brightness control data D11' to the display panel 12 through a specific interface. For example, in the cases where the brightness adjustment system 1 is a mobile system, the specific interface can be a mobile application (APP) or a mobile application processor; in the cases where the brightness adjustment system 1 is display panel system, the specific interface can be a display driver integrated circuit (IC). Then, the display panel 12 adjusts the brightness according to the image data D10' and the brightness control data D11'.

Figure 9:
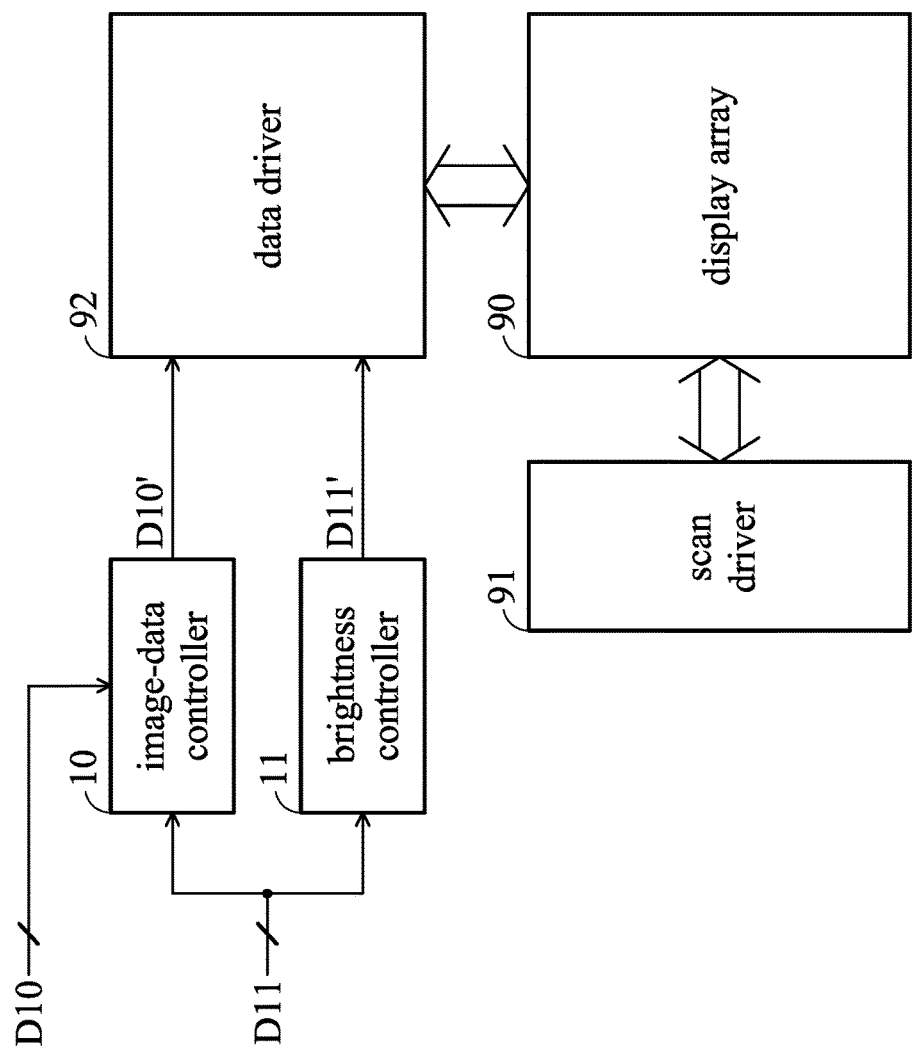
FIG. 9 shows an exemplary embodiment of a display panel.

In some embodiments, the image-data controller 10 and the brightness controller 11 may be disposed in the display panel. In other words, the image-data controller 10 and the brightness controller 11 are part of the display panel 12. In an embodiment, referring to FIG. 9, an OLED display panel 9 comprises the image-data controller 10 and the brightness controller 11 and further comprises a display array 90, a scan driver 91, and a data driver 92. The image-data controller 10 and the brightness controller 11 respectively receive the image data D10 and the brightness control data D11 transmitted from a host through a specific interface. For example, in the cases where the brightness adjustment system 1 is a mobile system, the specific interface can be a mobile application (APP) or a mobile application processor; in the cases where the brightness adjustment system 1 is display panel system, the specific interface can be a display driver integrated circuit (IC). The data driver 92 receives the image data D10' and the brightness control data D11' and provides image signal to the pixels of the display array 90 according to the image data D10' and the brightness control data D11, thereby adjusting the brightness of the display panel 12. In an embodiment, the image-data controller 10 and the brightness controller 11 may be part of the data driver 92.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for adjusting brightness of a display panel, comprising:
   receiving first brightness control data;
   receiving first image data to be displayed on the display panel;
   converting the first image data into second image data according to the first brightness control data for adjusting the brightness of the display panel;
   converting the first brightness control data into second brightness control data; and
   adjusting the brightness of the display panel according to the second image data and the second brightness control data;
   wherein converting the first brightness control data into the second brightness control data comprises:
      determining whether the first brightness control data is between a first threshold and a second threshold, wherein the second threshold is larger than the first threshold;
      when the first brightness control data is between the first threshold and the second threshold, setting the second brightness control data at a first brightness value; and
      when the first brightness control data is not between the first threshold and the second threshold, converting the first brightness control data into the second brightness control data through linear mapping.

2. The method as claimed in claim 1, wherein the first brightness control data is 10-bit data, and the second brightness control data is 8-bit data.

3. The method as claimed in claim 1, wherein converting the first brightness control data into the second brightness control data through linear mapping comprises:
   (S50~S51) determining whether the first brightness control data is smaller than the first threshold or larger than the second threshold,
   (S54) when the first brightness control data is smaller than the first threshold, converting the first brightness control data into the second brightness control data by a first linear relationship; and
   when the first brightness control data is larger than the second threshold, converting the first brightness control data into the second brightness control data by a second linear relationship, wherein the second linear relationship is different from the first linear relationship.

4. A method for adjusting brightness of a display panel, comprising:
   receiving first brightness control data;
   receiving first image data to be displayed on the display panel; and
   converting the first image data into second image data according to the first brightness control data for adjusting the brightness of the display panel, wherein the first image data has a first intensity value, and converting the first image data into the second image data comprises:
determining whether the first brightness control data is between a first threshold and a second threshold, wherein the second threshold is larger than the first threshold;
when the first brightness control data is between the first threshold and the second threshold, converting the first image data into the second image data by a linear relationship; and
when the first brightness control data is not between the first threshold and the second threshold, determining whether the first brightness control data is smaller than the first threshold; and
when the first brightness control data is smaller than the first threshold, setting the second image data to be a second intensity value, wherein the second intensity value is smaller than the first intensity value.

5. The method as claimed in claim 4, wherein converting the first image data into the second image data further comprises:
when the first brightness control data is not between the first threshold and the second threshold, determining whether the first brightness control data is larger than the second threshold; and
when the first brightness control data is larger than the second threshold, setting the second image data to be the first intensity value.

6. The method as claimed in claim 1, wherein the first brightness control data is generated according to an intensity of environment light or generated by a man-machine interface (MMI).

7. The method as claimed in claim 1, further comprising:
transmitting the second image data to the display panel through an interface; and
adjusting the brightness of the display panel according to the second image data by the display panel.

8. The method as claimed in claim 1, wherein the first image data and the first brightness control data are received by the display panel, and the method further comprises:
adjusting the brightness of the display panel according to the second image data by the display panel.

9. A brightness adjustment system comprising:
a display panel;
a first controller receiving first brightness control data and first image data to be displayed on the display panel, and converting the first image data into second image data according to the first brightness control data for adjusting the brightness of the display panel;
a second controller receiving the first brightness control data and converting the first brightness control data into second brightness control data;
wherein the display panel adjusts the brightness of the display panel according to the second image data and the second brightness control data;
wherein the second controller determines the first brightness control data, wherein the second threshold is larger than the first threshold,
wherein when the second controller determines that the first brightness control data is between a first threshold and a second threshold, the second controller sets the second brightness control data to be a first brightness value, the second threshold is larger than the first threshold, and
wherein when the second controller determines that the first brightness control data is not between the first threshold and the second threshold, the second controller converts the first brightness control data into the second brightness control data through linear mapping.

10. The brightness adjustment system as claimed in claim 9, wherein the first brightness control data is 10-bit data, and the second brightness control data is 8-bit data.

11. The brightness adjustment system as claimed in claim 9,
wherein when the second controller determines that the first brightness control data is smaller than the first threshold, the second controller converts the first brightness control data into the second brightness control data by a first linear relationship, and
wherein when the second controller determines that the first brightness control data is larger than the second threshold, the second controller converts the first brightness control data into the second brightness control data by a second linear relationship which is different from the first linear relationship.

12. The brightness adjustment system as claimed in claim 9,
wherein the first image data has a first intensity value,
wherein the first controller determines a level of the first brightness control data,
wherein when the first controller determines that the first brightness control data is between a first threshold and a second threshold which larger than the first threshold, the first controller converts the first image data into the second image data by a linear relationship, and
wherein when the first controller determines that level of the first brightness control data is smaller than the first threshold, the first controller sets the second image data to be a second intensity value which is smaller than the first intensity value.

13. The brightness adjustment system as claimed in claim 12,
wherein when the first controller determines that the first brightness control data is larger than the second threshold, the first controller sets the second image data to be the first intensity.

14. The brightness adjustment system as claimed in claim 9, wherein the first brightness control data is related to an intensity of environment light or generated by man-machine interface (MMI).

15. The brightness adjustment system as claimed in claim 9, wherein the first controller is a processor in a host coupled to the display panel, and the display panel receives the second image data and adjusts the brightness of the display panel according to the second image data.

16. The brightness adjustment system as claimed in claim 9, the first controller is in the display panel, and the display panel receives the second image data and adjusts the brightness of the display panel according to the second image data.

* * * * *